Figure 1:
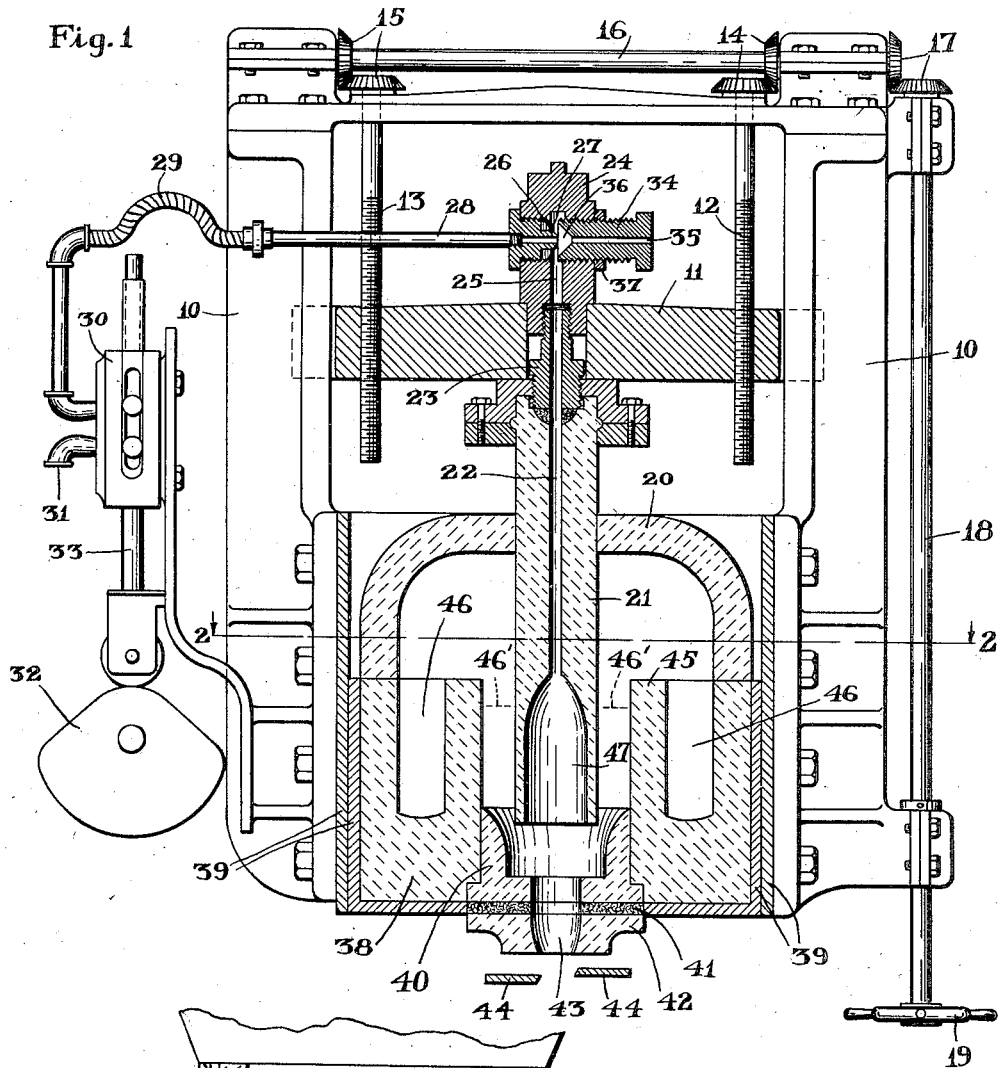

Feb. 18, 1936.   J. W. HARDING   2,031,413
GLASS FEEDING DEVICE
Filed March 10, 1934

INVENTOR:
John W. Harding

UNITED STATES PATENT OFFICE 2,031,413

GLASS FEEDING DEVICE

John William Harding, Brockway, Pa.

Application March 10, 1934, Serial No. 714,993

3 Claims. (Cl. 49—55)

This invention relates to glass feeding devices, and has for an object to provide an improved type of forehearth and accessories adapted to control the discharge of molten glass therefrom in an approved manner.

A further object of the invention is to provide a forehearth having a well formed therein defined by a curb upstanding within the forehearth, defining upon the opposite side a recess or chamber for holding the molten glass out of contact with outside walls and permitting the use of hot blasts when found desirable.

A further object of the invention is to provide a forehearth having an adjustable needle and improved type of master bushing.

A further object of the invention is to provide a glass feeding device including a hollow needle with improved means for exhausting air from the interior of the needle to control the discharge of molten glass through the master bushing.

A further object of the invention is to provide a glass feeding device having a needle with a bore extending longitudinally therethrough and in communication with a chamber, in which said chamber is mounted a nozzle for the projecting of air under pressure across said chamber to entrain air from the bore of the needle and to thereby attenuate the air within the interior of the needle to control the discharge of glass.

The invention, therefore, comprises the forehearth of a glass melting furnace having a master bushing of improved type for the directing of the outflow of the molten glass, with a needle adjustable relative to the bushing and having a longitudinal perforation therethrough communicating with a chamber across which air is discharged under pressure to entrain air from the needle, said needle being surrounded by a curb forming a well within which said needle is adjustable, said curb also forming a chamber partially surrounding the well, which is adapted to receive a hot blast when desired.

Figure 2:
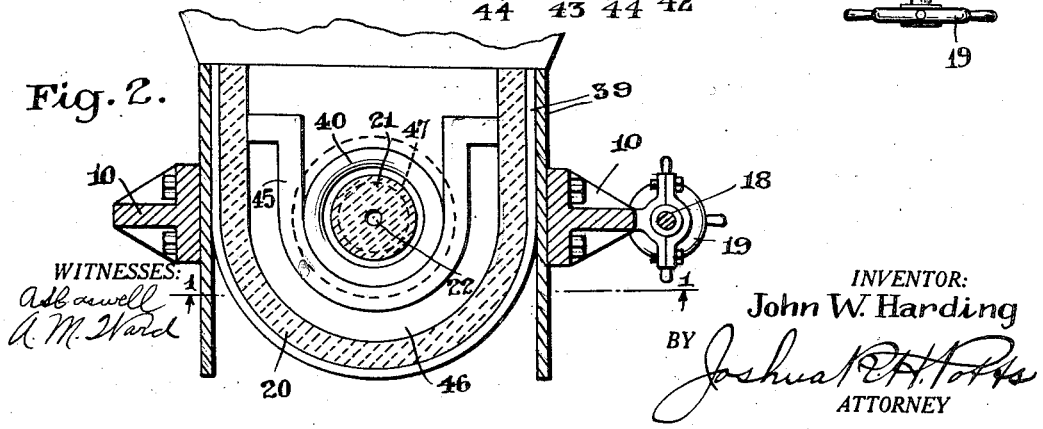

The drawing illustrates an embodiment of the invention and the views therein are as follows:

Figure 1 is a vertical view partly in elevation and partly in section, through the forehearth of the furnace, and Figure 2 is a horizontal sectional view taken on line 2—2 of Figure 1 and showing line 1—1 as the plane of Figure 1.

Like characters of reference indicate corresponding parts throughout the several views.

The improved glass feeding device which forms the subject-matter of this application comprises a frame 10 rigidly connected with the forehearth and rising thereabove. The frame above the forehearth is adapted to act as guides for the cross head 11, which in turn is controlled by screws 12 and 13 through the medium of gears 14 and 15 upon the shaft 16, which in turn, through the gears 17, is controlled by the shaft 18 and handwheel 19, so that the cross head 11 may be manually raised and lowered.

The forehearth has the usual hood 20 of refractory material, through the top of which is slidably mounted a needle 21, also of refractory material, and connected with the cross head 11, to be raised and lowered therewith.

The needle 21 is provided with a longitudinally extending bore 22 which communicates through proper fittings 23 and 24, with the passage 25 in the latter fitting. By threaded bores from opposite sides of the fitting 24 a chamber 26 is formed into which extends a nozzle 27. This nozzle 27 communicates by means of a pipe 28 and flexible section 29 with a slide valve organization 30 which receives air under pressure at the fitting 31.

The flow of air from the fitting 31 to the pipe 29 is controlled by means of a cam 32 actuating a plunger rod 33 and having connected therewith a slide valve of ordinary construction.

Extending into the fitting 24 from the side opposite the nozzle 27 is a threaded plug 34 having a passage 35 axially thereof, and in alignment with the passage of the nozzle 27.

The fitting 34 is formed at its end next the nozzle 27 with a conical recess 36 and is adjustable by movement upon its threads, such adjustment being maintained by a lock nut 37.

Below the hood 20 a refractory member 38 is supported by the supporting parts 39, and is provided with an opening in the bottom adapted to receive the master bushing 40. Preferably, this master bushing 40 will be set upon an asbestos or other insulating gasket 41 and with an outside section 42, all of which are provided with a throat 43 adapted to direct molten glass downwardly between the blades 44 of the shears.

The member 38 carries a curb 45 which is spaced away from the outer wall, forming a horseshoe-shaped member 46.

As will be noted more particularly from Figure 2, this chamber 46 surrounds the outer side of the well within which the needle 21 is located, so that the glass, which is preferably maintained therein at the level indicated by the dotted lines 46', is held out of engagement with the outer walls. This chamber 46 is also adapted to receive a hot blast from any approved or convenient source as may be found desirable.

It will be noted that the bore 22 of the needle 21 is enlarged at 47 at its lower end so that immediately within and above the master bushing 40 the needle presents a chamber which is in communication with the longitudinal bore and of such proportions as to accommodate a considerable body of molten glass which is drawn thereinto.

In operation, the needle 21 will be adjusted to control the discharge of a predetermined amount of molten glass through the throat 43 during a predetermined period. This period is determined by the rotation of the cam 32.

The discharge of air under pressure controlled by the valve 30 and through the nozzle 27 across the chamber 26 into the conical recess 36 will entrain air from the bore 22 and chamber 47 so that the air within such bore and chamber is attenuated.

The attenuation of the air serves to draw the molten glass upwardly into the chamber 47. As this chamber and the bore is normally open to the atmosphere through the bore 35 of the fitting 34, when the entraining of air is relieved, there is a backward movement of the air into the needle so that the glass contained within the chamber 47 is instantly discharged therefrom and through the throat 4 of the master bushing.

At predetermined intervals the shear blades 44 will close and clip the depending mass of glass from the protruding mass which latter is then drawn backwardly by the exhaustion of air from the chamber 47 in the manner just described. Of course, it is obvious that the shear and the valve 30 must operate in synchronism so that the required amount of glass will be sheared at the exact instant that the remaining body of glass above the shears is to be drawn backwardly into the chamber 47.

Of course, the glass feeding device herein described may be modified and changed in various ways without departing from the invention herein set forth and hereinafter claimed.

I claim:—

1. A glass feeding device comprising a forehearth having a discharge opening therefrom, a tubular needle associated with said discharge opening, a chamber in communication with the tube of said needle, means adapted to project air under pressure across said chamber to entrain air from the tubular part of the needle, and means to vary the distance of projection.

2. A glass feeding device comprising a forehearth having a well therein, said well being defined by a curb of approximately uniform thickness surrounding the major part of said well and defining an arcuate chamber between said curb and the outer walls of said forehearth, said well having a discharge opening in the bottom thereof, a needle having a chamber in its bottom located adjacent to the discharge opening, and a passage longitudinally therethrough communicating with a chamber, means to project air under pressure across said chamber, means to employ said projected air to entrain air from the passage in the needle, and means to vary the distance of projection.

3. In a glass feeding device, a forehearth having an arcuate curb of approximately uniform thickness erected therein and spaced from the outer walls thereof providing an arcuate chamber intermediate said curb and said walls, a master bushing located within the arcuature of said curb and provided with a discharge throat, a needle having a chamber at its lower end in association with said master bushing and discharge throat and continued by a passage longitudinally through said needle, a fitting having a conduit in communication with the passage of said needle and providing a chamber, means to discharge air under pressure through said chamber, means to employ said air under pressure to entrain air from the passage of the needle, means to vary the distance of travel of said air, means to interrupt the flow of air under pressure periodically, and means to raise and lower the needle relative to the master bushing.

JOHN WILLIAM HARDING.